US007281533B2

(12) United States Patent
Kiyomura et al.

(10) Patent No.: US 7,281,533 B2
(45) Date of Patent: Oct. 16, 2007

(54) AIR-FUEL RATIO FEEDBACK CONTROL APPARATUS AND METHOD FOR INTERNAL COMBUSTION ENGINE

(75) Inventors: Akira Kiyomura, Isesaki (JP); Hisanori Ozaki, Tokyo (JP)

(73) Assignees: Hitachi, Ltd., Tokyo (JP); Fuji Heavy Industries Ltd., Tokyo (JP)

( * ) Notice: Subject to any disclaimer, the term of this patent is extended or adjusted under 35 U.S.C. 154(b) by 129 days.

(21) Appl. No.: 11/293,099

(22) Filed: Dec. 5, 2005

(65) Prior Publication Data

US 2006/0118095 A1 Jun. 8, 2006

(30) Foreign Application Priority Data

Dec. 6, 2004 (JP) ............................ 2004-352243
May 23, 2005 (JP) ............................ 2005-150058

(51) Int. Cl.
*F02D 41/14* (2006.01)
*G06F 19/00* (2006.01)

(52) U.S. Cl. ...................................... 123/674; 701/109

(58) Field of Classification Search ........ 123/672–675, 123/679, 688, 690, 695; 701/103, 109; 60/274, 60/276, 285
See application file for complete search history.

(56) References Cited

U.S. PATENT DOCUMENTS

| | | | | |
|---|---|---|---|---|
| 6,494,038 | B2 * | 12/2002 | Kobayashi et al. | 60/285 |
| 6,666,198 | B2 * | 12/2003 | Mitsutani | 123/674 |
| 6,920,388 | B2 * | 7/2005 | Yasui | 701/109 |
| 6,985,809 | B2 * | 1/2006 | Yasui | 701/109 |
| 6,990,402 | B2 * | 1/2006 | Yasui et al. | 123/674 |
| 7,162,359 | B2 * | 1/2007 | Yasui | 701/109 |
| 2002/0073965 | A1 * | 6/2002 | Takahashi et al. | 60/276 |
| 2003/0023328 | A1 * | 1/2003 | Yasui | 701/103 |
| 2003/0187568 | A1 * | 10/2003 | Yasui et al. | 701/109 |
| 2004/0252625 | A1 * | 12/2004 | Yasui et al. | 73/865.9 |

FOREIGN PATENT DOCUMENTS

| | | |
|---|---|---|
| JP | 05-141294 A | 6/1993 |
| JP | 11-264340 A | 9/1999 |

* cited by examiner

*Primary Examiner*—Willis R. Wolfe, Jr.
(74) *Attorney, Agent, or Firm*—Foley & Lardner LLP

(57) ABSTRACT

A feedback control of an air-fuel ratio of an internal combustion engine is performed in such a manner that when fuel injection is resumed from a condition where fuel injection is stopped due to deceleration running, air-fuel ratio feedback control is resumed once the output from an air-fuel ratio sensor indicates an air-fuel ratio less than or equal to a threshold value SL.

23 Claims, 11 Drawing Sheets

AIR-FUEL RATIO FEEDBACK CONTROL APPARATUS AND METHOD FOR INTERNAL COMBUSTION ENGINE

BACKGROUND OF THE INVENTION

1. Field of the Invention

The present invention relates to an apparatus and method for performing feedback control of an air-fuel ratio of an internal combustion engine, based on signals from an air-fuel ratio sensor.

2. Description of the Related Art

In Japanese Unexamined Patent Publication No. 05-141294, an air-fuel ratio control method is disclosed in which feedback control of the injection quantity is performed based on detected values relating to the air-fuel ratio provided by an air-fuel sensor, wherein a manipulated variable is prevented from updating for a predetermined period of time immediately after fuel injection is resumed from a stopped state.

Immediately after fuel injection is resumed, the delayed response of the air-fuel ratio sensor causes the air-fuel ratio detected to be leaner than the actual ratio, and consequently, by prohibiting updating of the manipulated variable for a predetermined period of time immediately after fuel injection is resumed, any excessive increase in the quantity of correction to the injection quantity can be prevented.

However, if the transient response of the air-fuel ratio sensor deteriorates, updating of the manipulated variable begins during the period of delayed response of the air-fuel ratio sensor, and an increase in the quantity of correction to the injection quantity becomes excessive.

Here, if the length of time during which updating of the manipulated variable is prohibited, is extended so that the manipulated variable is not updated during the period of delayed response even if the transient response of the air-fuel ratio sensor deteriorates, a problem arises in that when the transient response of the air-fuel ratio sensor has not deteriorated, the manipulated variable begins to update after an unjustifiable delay, and convergence on the target air-fuel ratio is delayed.

SUMMARY OF THE INVENTION

Therefore, an object of the present invention is to be able to avoid overcorrection of the injection quantity, i.e., occurrence of an excessive increase in the quantity of correction to the injection quantity, and to prevent excessive delays before the manipulated variable begins to update, even if the transient response of the air-fuel ratio sensor deteriorates.

In order to achieve this object, in the present invention, a signal from the air-fuel ratio sensor is compared with a threshold value, and a determination is made as to whether or not to begin updating the manipulation signal, based on the results of this comparison.

The other objects and features of this invention will become understood from the following description with reference to the accompanying drawings.

DESCRIPTION OF PREFERRED EMBODIMENTS

Figure 1:
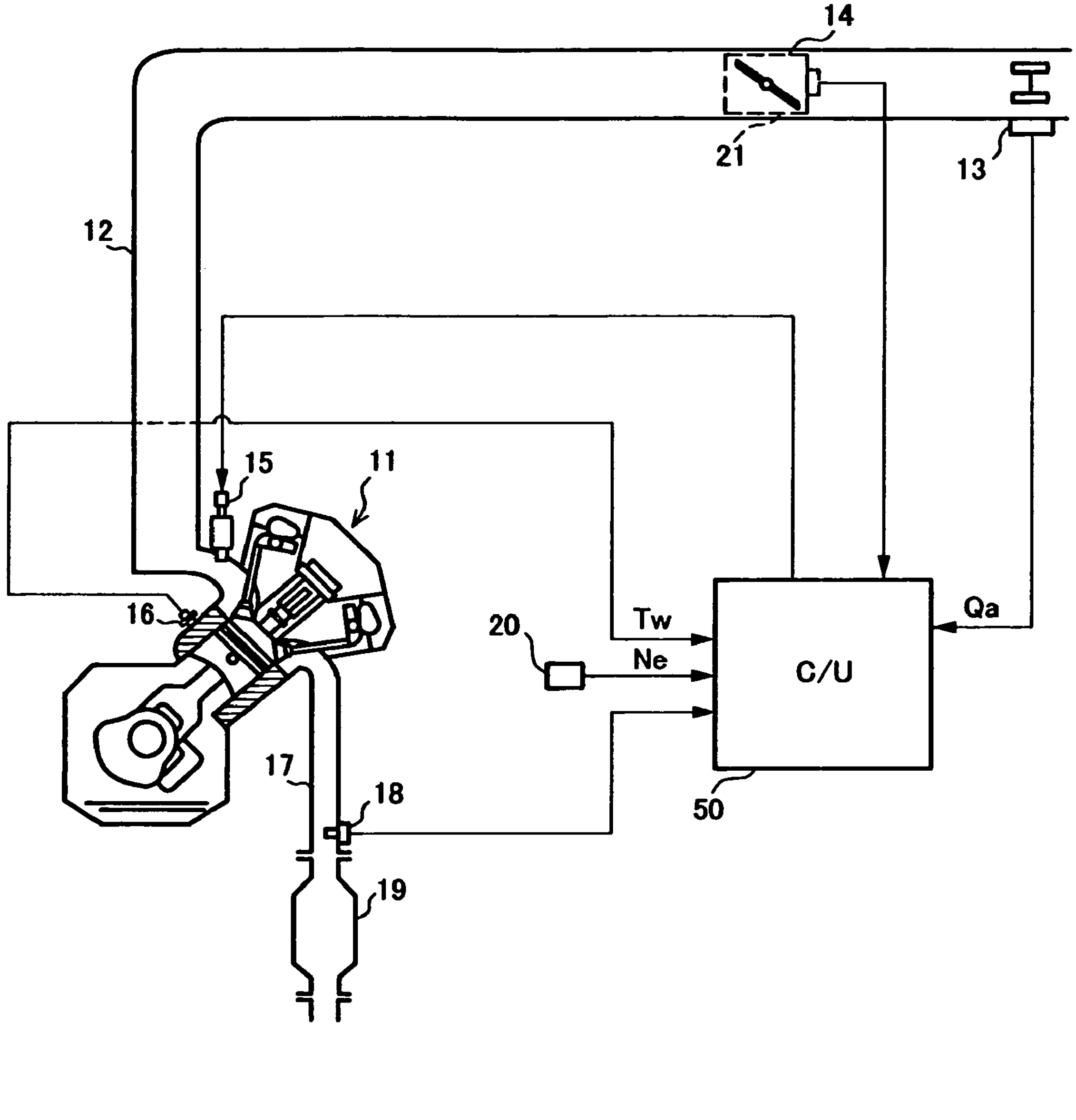
FIG. 1 is a system diagram of an internal combustion engine according to an embodiment of the invention.

Referring to FIG. 1, which is a diagram showing an internal combustion engine according to an embodiment of the invention, an inlet pipe 12 of an internal combustion engine 11 is provided with an air flow meter 13 which detects an intake air quantity Qa, and a throttle valve 14 which adjusts the intake air quantity Qa.

Throttle valve 14 opens and closes in conjunction with an accelerator pedal (not shown in the drawing).

A fuel injection valve 15 is provided for each cylinder on the downstream side of throttle valve 14.

Fuel injection valves 15 are controlled to open the related valves by an injection pulse signal output from a control unit 50, and injects fuel by a quantity which is in proportion to an injection pulse width of the injection pulse signal.

A water temperature sensor 16 which detects a cooling water temperature Tw is provided on a cooling jacket of internal combustion engine 11.

An exhaust pipe 17 is provided with an air-fuel ratio sensor 18 which detects a wide range of air-fuel ratios of the combusted air-fuel mixture, based on the oxygen concentration in the exhaust.

A three way catalytic converter 19 which oxidizes CO and HC, and reduces NOx is installed on the downstream side of air-fuel ratio sensor 18.

Here, the construction of air-fuel ratio sensor 18, and the principles involved in detecting the air-fuel ratio are described.

Figure 2:
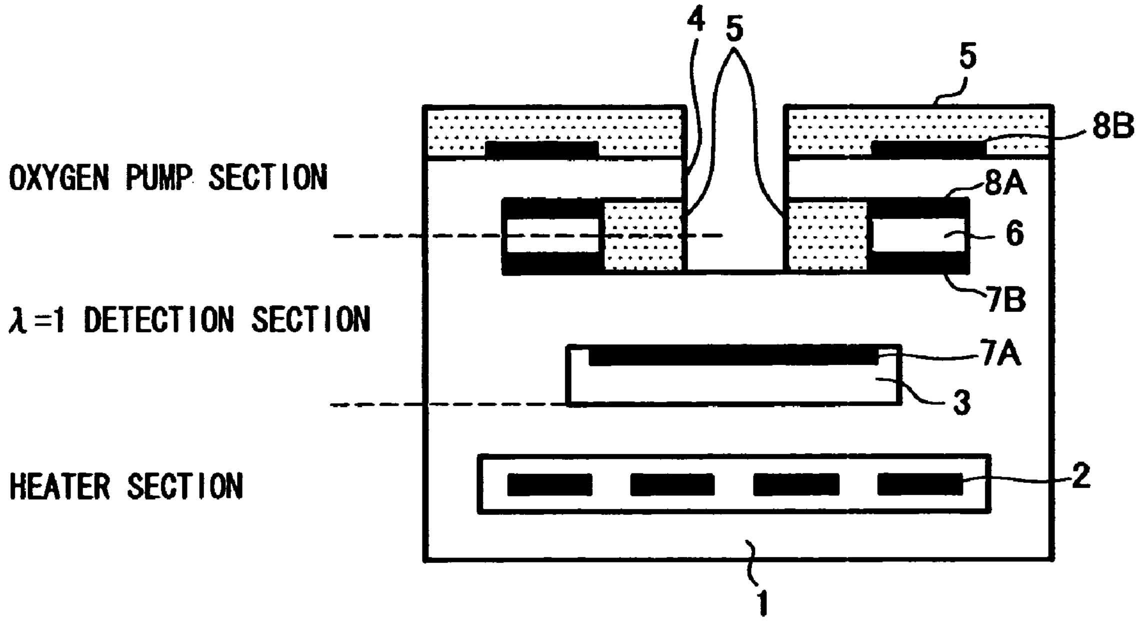
FIG. 2 is a structural drawing of an air-fuel ratio sensor according to the embodiment of the invention.

Referring to FIG. 2, which shows the construction of air-fuel ratio sensor 18, a main body 1 of air-fuel ratio sensor 18 is made of a porous insulating material having oxygen ion conductivity, such as zirconia, and a heater section 2 is provided on main body 1.

Furthermore, an air introducing hole 3 which communicates with atmospheric air, and a gas diffusion layer 6 which communicates with the inside of exhaust pipe 17 via a gas introducing hole 4 and a protective layer 5, are provided in main body 1.

Sensing electrodes 7A and 7B are provided facing air introducing hole 3 and gas diffusion layer 6.

Oxygen pump electrodes 8A and 8B are provided on gas diffusion layer 6 and on the corresponding periphery of main body 1.

A voltage corresponding to the ratio of the oxygen ion concentration in gas diffusion layer 6 and the oxygen ion concentration in the atmosphere is generated between sensing electrodes 7A and 7B, and whether the air-fuel ratio inside gas diffusion layer 6 is richer or leaner than the theoretical air fuel ratio, is detected based on this voltage.

On the other hand, a voltage corresponding to the voltage generated between sensing electrodes 7A and 7B is applied to oxygen pump electrodes 8A and 8B.

When a voltage is applied to oxygen pump electrodes 8A and 8B, the oxygen ions within gas diffusion layer 6 move, and current flows between oxygen pump electrodes 8A and 8B.

Here, because the current value Ip which flows between oxygen pump electrodes 8A and 8B is affected by the oxygen ion concentration in the exhaust, the air-fuel ratio can be detected by detecting the current value Ip.

Figure 3:
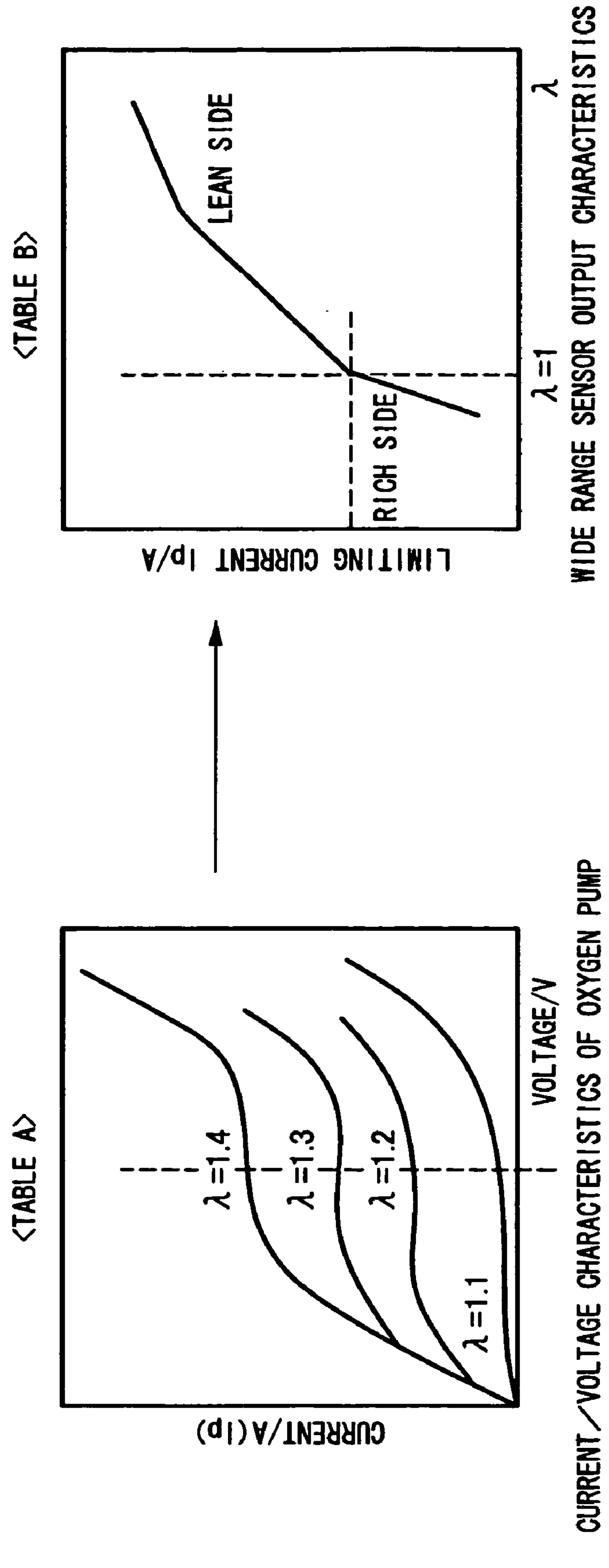
FIG. 3 is a diagram for explaining the detection principle of the air-fuel ratio sensor according to the embodiment of the invention.

In other words, as shown in the table (A) in FIG. 3, a correlation is obtained between the current/voltage of oxygen pump electrodes 8A and 8B, and the air-fuel ratio.

By reversing the direction of application of voltage to oxygen pump electrodes 8A and 8B based on the output of sensing electrodes 7A and 7B, the air-fuel ratio can be detected in both lean and rich regions based on the current value Ip which flows between oxygen pump electrodes 8A and 8B (refer to table (B) in FIG. 3).

Here, the description returns to FIG. 1.

A crank angle sensor 20 which detects the angle of rotation of the crankshaft, is provided in internal combustion engine 11.

In control unit 50, the engine rotating speed Ne is calculated based on a signal output from crank angle sensor 20.

Furthermore, a throttle sensor 21 which detects the opening of throttle valve 14 is provided.

Control unit 50 includes therein a microcomputer composed of such components as a CPU, a ROM, a RAM, an A/D converter, and an I/O interface.

Control unit 50 receives the input of the detection signals of air-fuel ratio sensor 18, air flow meter 13, water temperature sensor 16, crank angle sensor 20, and throttle sensor 21, and performs arithmetic processing according to a pre-stored program, to thereby control the fuel injection by means of fuel injection valves 15.

The injection quantity of fuel injection valves 15 is set as follows.

First, a basic fuel injection pulse width Tp is calculated from the intake air quantity Qa detected by air flow meter 13, and the engine rotating speed Ne determined from the signal from crank angle sensor 20.

$$Tp = K \times Qa/Ne \text{ (where K is a constant)}$$

Furthermore, a correction coefficient Kw which increases the injection quantity when the cooling water temperature is low, a correction coefficient Kas which increases the injection quantity at and after starting of internal combustion engine 11, a feedback correction coefficient LAMBDA which matches the air-fuel ratio with a target value, a correction amount Ts which is set according to the battery voltage, and a target equivalence ratio Z corresponding to the target air-fuel ratio are calculated.

A final fuel injection pulse width Ti is calculated in accordance with the following equation:

$$Ti = Tp \times (1 + Kw + Kas + \ldots) \times \text{LAMBDA} \times Z + Ts$$

Control unit 50 outputs an injection pulse signal of the fuel injection pulse width Ti to fuel injection valves 15 in synchronization with the stroke of each cylinder. As a result, an amount of fuel in proportion to an effective injection pulse width Te obtained by subtracting the correction amount Ts from the fuel injection pulse width Ti, is injected into each cylinder from fuel injection valves 15.

The feedback correction coefficient LAMBDA is set by performing proportional, integral and derivative actions based on the deviation of the air-fuel ratio detected by air-fuel ratio sensor 18 from the target air-fuel ratio (target equivalence ratio).

Furthermore, control unit 50 performs control to temporarily stop fuel injection by fuel injection valves 15 during deceleration of internal combustion engine 11.

In this fuel cut control which occurs during deceleration, when the opening of throttle valve 14 detected by throttle sensor 21 is fully closed, and the engine rotating speed Ne exceeds a first threshold value Ne1 during deceleration, fuel cut begins. Then, when throttle valve 14 is opened, or the engine rotating speed Ne falls below a second threshold value Ne2 (Ne2<Ne1), fuel injection by fuel injection valves 15 is resumed.

Figure 4:
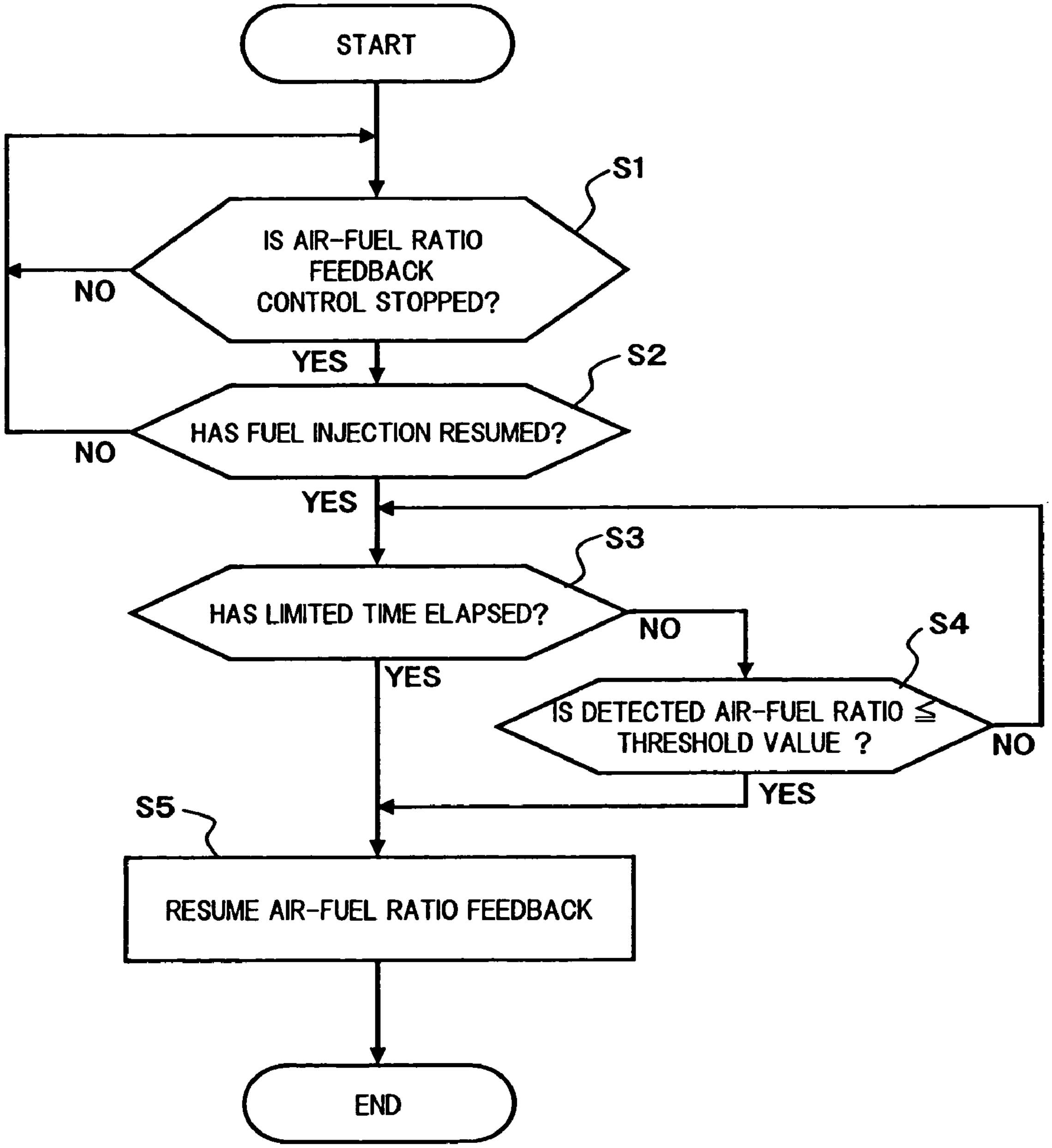
FIG. 4 is a flowchart showing resumption processing for air-fuel ratio feedback control according to the embodiment of the invention.

While fuel cut control is being performed during deceleration, the feedback correction coefficient LAMBDA is damped, but when fuel injection is resumed, as shown in the flowchart in FIG. 4, the feedback correction coefficient LAMBDA begins updating.

In the flowchart in FIG. 4, in step S1, whether or not fuel cut control under deceleration is in progress, and the feedback correction coefficient LAMBDA is clamped, is determined.

Thus step S1 determines whether or not air-fuel ratio feedback control is stopped.

If the feedback correction coefficient LAMBDA is clamped, the flow proceeds to step S2.

In step S2, a determination is made as to whether or not the conditions for resuming fuel injection have been met.

If the conditions for resuming fuel injection have been met, the flow proceeds to step S3, and a determination is made as to whether or not a pre-stored limited time has passed since resumption of fuel injection.

If still within the limited time since resumption of fuel injection, the flow proceeds to step S4.

In step S4, a determination is made as to whether or not the air-fuel ratio detected by air-fuel ratio sensor 18 has reached a threshold value SL.

During fuel cut control, the detection results of air-fuel ratio sensor 18 indicate a super lean air-fuel mixture. Subsequently, after fuel injection is resumed and exhaust flows into exhaust pipe 17, the detected value of air-fuel ratio sensor 18 reaches a value corresponding to the actual air-fuel ratio after the resumption of fuel injection, once a delayed response time has elapsed, which includes the transit time of the exhaust and the delayed response time of air-fuel ratio sensor 18.

Here, if air-fuel ratio feedback control is resumed before the delayed response time has elapsed, air-fuel ratio sensor 18 detects an air-fuel ratio considerably leaner than the actual air-fuel ratio, and consequently the injection quantity is increased excessively.

Thus, whether or not the output of air-fuel ratio sensor 18 is sufficiently close to a value corresponding to the actual air-fuel ratio, is determined by determining whether or not the air-fuel ratio detected by air-fuel ratio sensor 18 has reached a threshold value SL.

In step S4, if it is determined that the air-fuel ratio detected by air-fuel ratio sensor 18 is at or below the threshold value SL, the flow proceeds to step S5, and the feedback correction coefficient LAMBDA which had been clamped up until then, begins to update again.

Here, even if the transient response of air-fuel ratio sensor 18 has deteriorated, this deterioration of the transient response delays the air-fuel ratio reaching the threshold value SL, which delays the resumption of feedback control, and it is possible to prevent the excessive increase in correction to the injection quantity that occurs when feedback control is resumed within the delayed response time.

Furthermore, if the transient response of air-fuel ratio sensor 18 is in the initial state, and the threshold value SL is reached relatively quickly, feedback control is resumed that much more quickly, and consequently, the resumption of feedback control is not delayed excessively, and convergence on the target air-fuel ratio is not worsened.

On the other hand, if the air-fuel ratio detected by air-fuel ratio sensor 18 is not at or below the threshold value SL within the limited time, and a determination is made that the limited time has elapsed since resuming fuel injection in step S3, the flow proceeds to step S5, and feedback control is forcibly resumed.

Accordingly, a situation in which fuel injection is resumed while feedback control is left unresumed can be avoided.

The limited time can be a pre-stored length of time, but may also be set in a variable manner according to such factors as the engine rotating speed and engine load.

In addition, the limited time may be measured as the time until the integrated value of the number of rotations of engine 11 reaches a predetermined number.

Figure 5:
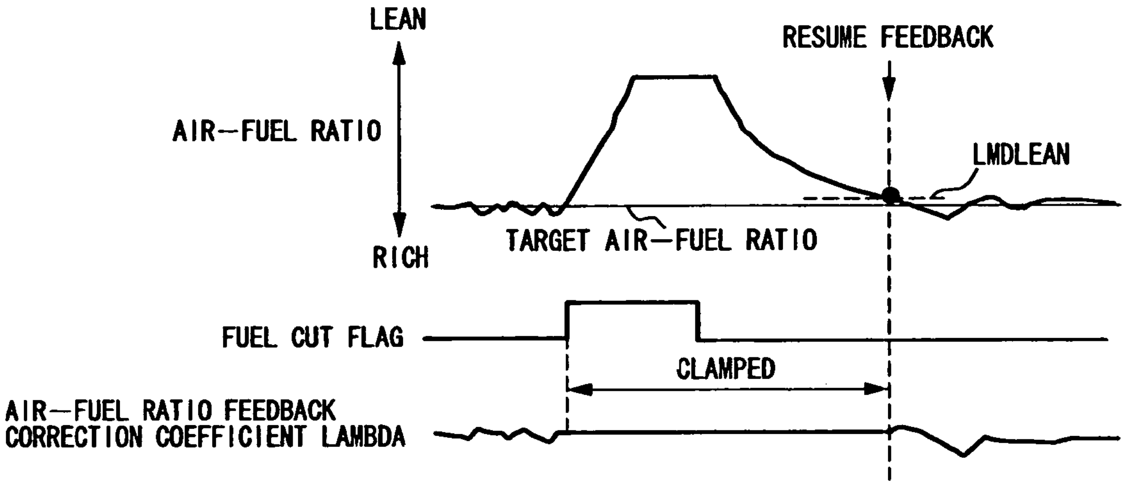
FIG. 5 is a time chart showing resumption timing of air-fuel ratio feedback control according to the embodiment of the invention.

As shown in FIG. 5, the threshold value SL may be a pre-stored fixed value LMDLEAN.

Figure 6:
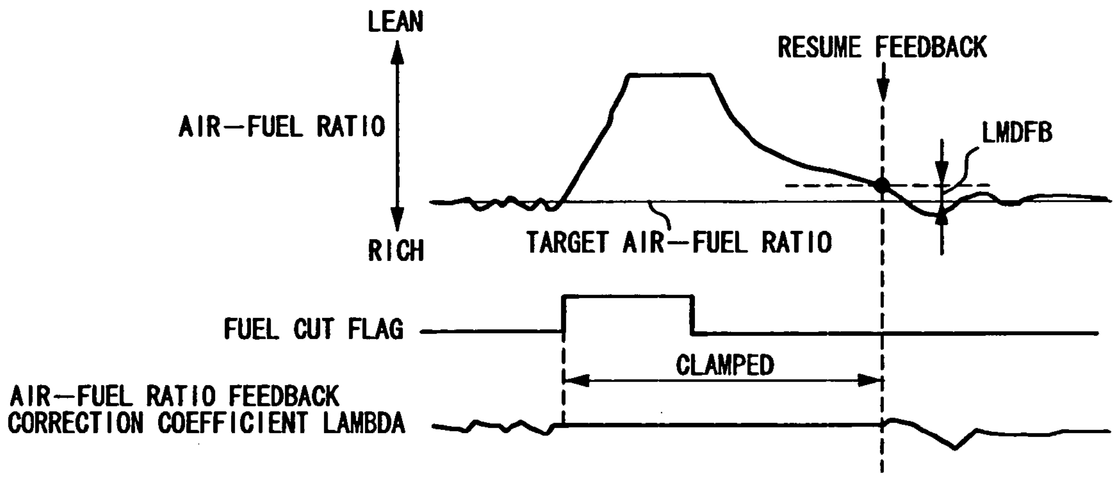
FIG. 6 is a time chart showing resumption timing of air-fuel ratio feedback control according to the embodiment of the invention.

Furthermore, as shown in FIG. 6, it is possible to resume air-fuel ratio feedback control at the point in time when the air-fuel ratio detected by air-fuel ratio sensor 18 reaches "the target air fuel ratio+a fixed value LMDFB", by setting the threshold value SL such that feedback control is resumed when the air-fuel ratio is within the range target air-fuel ratio−detected air-fuel ratio|≦fixed value LMDFB.

As shown in FIG. 6, by setting the threshold value SL based on the target air-fuel ratio, it is possible to accurately determine whether or not the detection results of air-fuel ratio sensor 18 are in the vicinity of the target air-fuel ratio, even when the target air-fuel ratio immediately after resuming fuel injection is different from the air-fuel ratio at the stop of the air-fuel ratio feedback control.

Figure 7:
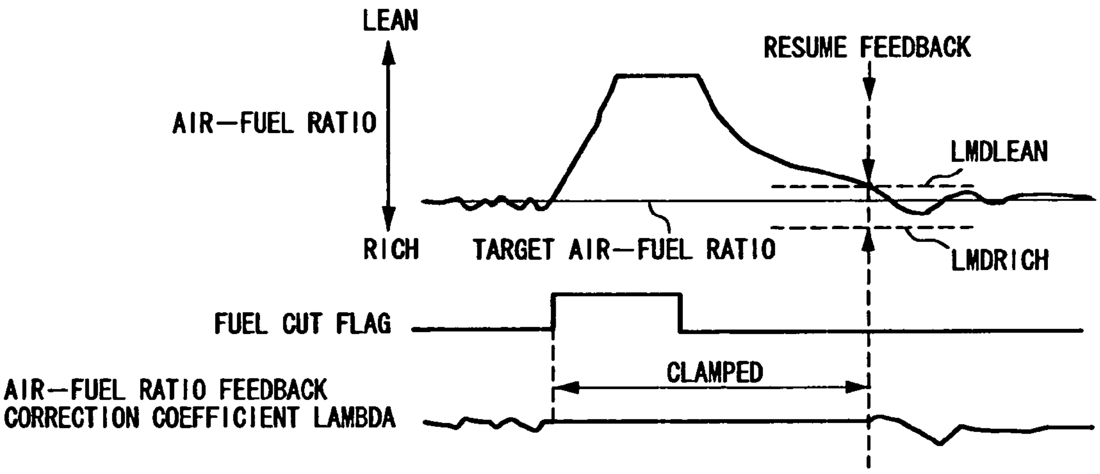
FIG. 7 is a time chart showing resumption timing of air-fuel ratio feedback control according to the embodiment of the invention.

In addition, as shown in FIG. 7, the threshold value SL can be set so that feedback control is resumed when the air-fuel ratio detected by air-fuel ratio sensor 18 is within a range between pre-stored fixed values LMDLEAN and LMDRICH.

Figure 8:
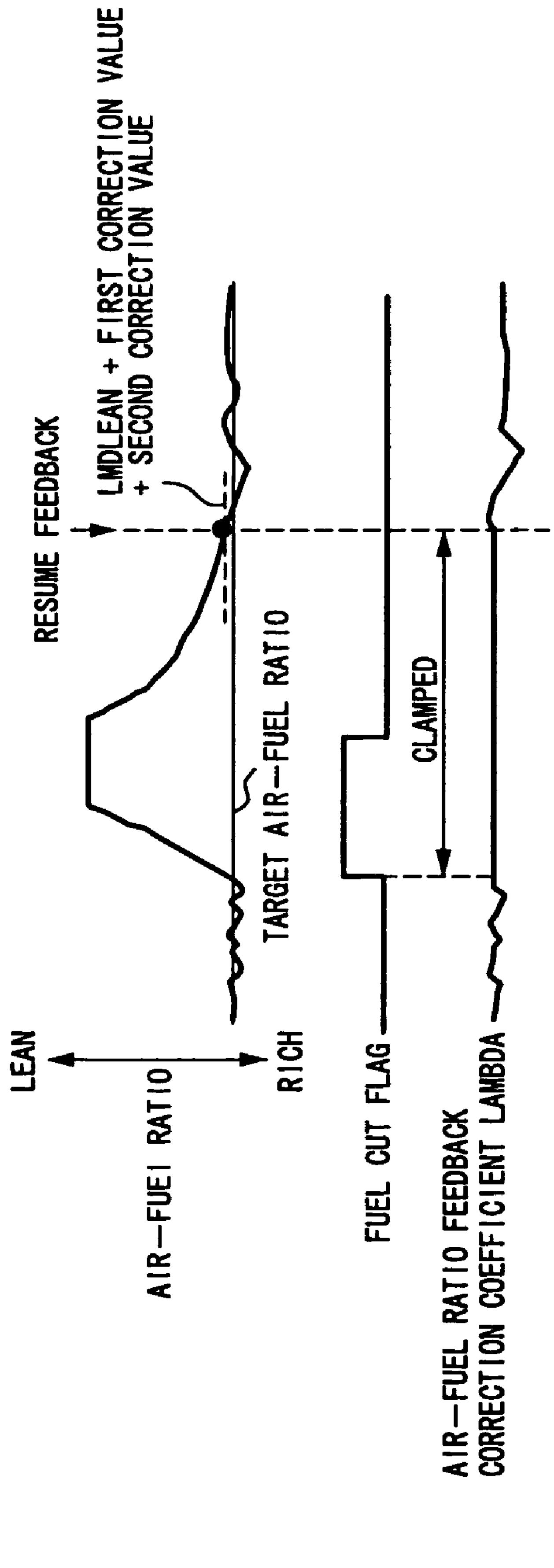
FIG. 8 is a time chart showing resumption timing of air-fuel ratio feedback control according to the embodiment of the invention.

The threshold value SL shown in FIG. 8 is set as "the pre-stored fixed value LMDLEAN+the first correction value+the second correction value", so that air-fuel ratio feedback control is resumed (update of the feedback correction coefficients) when the air-fuel ratio detected by air-fuel ratio sensor 18 is equal to or less than the above-mentioned "fixed value LMDLEAN+first correction value+second correction value".

The first correction value acts to correct the threshold value SL to a larger value as the transient response of air-fuel ratio sensor 18 improves, resulting in earlier timing for resumption of the air-fuel ratio feedback control, and conversely acts to correct the threshold value SL to a smaller value as the transient response of air-fuel ratio sensor 18 deteriorates, delaying the timing of resumption of the air-fuel ratio feedback control.

When the transient response of air-fuel ratio sensor 18 improves to become fast, because the sensor output reacts in a highly responsive manner to variation in the actual air-fuel ratio, feedback control can be performed from an early stage.

On the other hand, when the transient response of air-fuel ratio sensor 18 deteriorates to become poor, a long delay occurs before the sensor output corresponds to the actual air-fuel ratio, and if air-fuel ratio feedback control is resumed from an early stage, the fuel injection quantity must be overcorrected.

Accordingly, by changing the timing at which the air-fuel ratio feedback control is resumed based on the transient response of air-fuel ratio sensor 18, overcorrection can be avoided, and air-fuel ratio feedback control can be resumed from the earliest possible timing.

As disclosed in Japanese Unexamined Patent Publication No. 11-264340, the target air-fuel ratio is switched during air-fuel ratio feedback control, and the quality of the transient response of air-fuel ratio sensor 18 can be determined based on the time it takes for the output of the air-fuel ratio sensor to reach a predetermined value after switching.

Furthermore, the second correction value corrects the threshold value SL according to whether the air-fuel ratio obtained without feedback control shows a richer or leaner trend with respect to the target air-fuel ratio.

The air-fuel ratio obtained without feedback control is referred to below as the base air-fuel ratio.

In case where the air-fuel learned correction value is learned based on the air-fuel feedback correction coefficient, a lean tendency of the base air-fuel ratio is determined when the air-fuel ratio learned correction value is a correction value on the increasing side, and in contrast, a rich tendency of the base air-fuel ratio is determined when the air-fuel ratio learned correction value is a correction value on the decreasing side.

When the base air-fuel ratio indicates a rich tendency, if air-fuel ratio feedback control is begun early, the air-fuel ratio is further corrected to the rich side, and there is a higher possibility of overcorrection to the rich side.

In contrast, in a situation where the base air-fuel ratio indicates a lean tendency, there is already a need for correction to the rich side and thus, compared to a situation when a rich tendency is indicated, there is a low possibility of occurrence of overcorrection to the rich side even if air-fuel ratio feedback control is begun early.

Accordingly, the second correction value corrects the threshold value SL to a larger value when the base air-fuel ratio is lean, thereby resuming air-fuel ratio feedback control from an earlier timing, and conversely corrects the threshold value SL to a smaller value when the base air-fuel ratio is rich, thereby delaying the timing with which air-fuel ratio feedback control is resumed.

Figure 9:
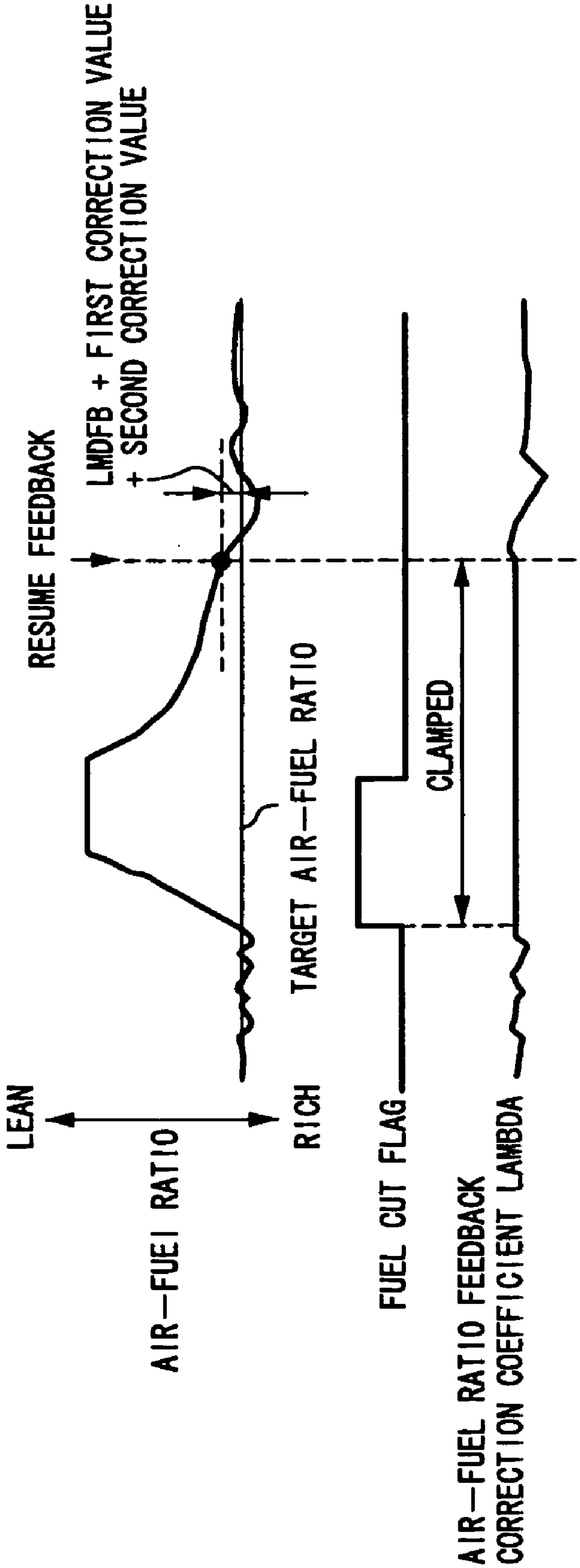
FIG. 9 is a time chart showing resumption timing of air-fuel ratio feedback control according to the embodiment of the invention.

The threshold value SL shown in FIG. 9 causes the air-fuel ratio feedback control to resume at the point in time when "|target air-fuel ratio−detected air-fuel ratio|≦fixed value LMDFB+first correction value+second correction value" is satisfied.

Here also the first correction value is set to a larger value as the transient response of air-fuel ratio sensor 18 improves, thus resuming the air-fuel ratio feedback control from an earlier timing.

Furthermore, the second correction value is set to a larger value if the base air-fuel ratio determined from the air-fuel ratio learned correction value is lean, thus resuming the air-fuel ratio feedback control from an earlier timing.

Figure 10:
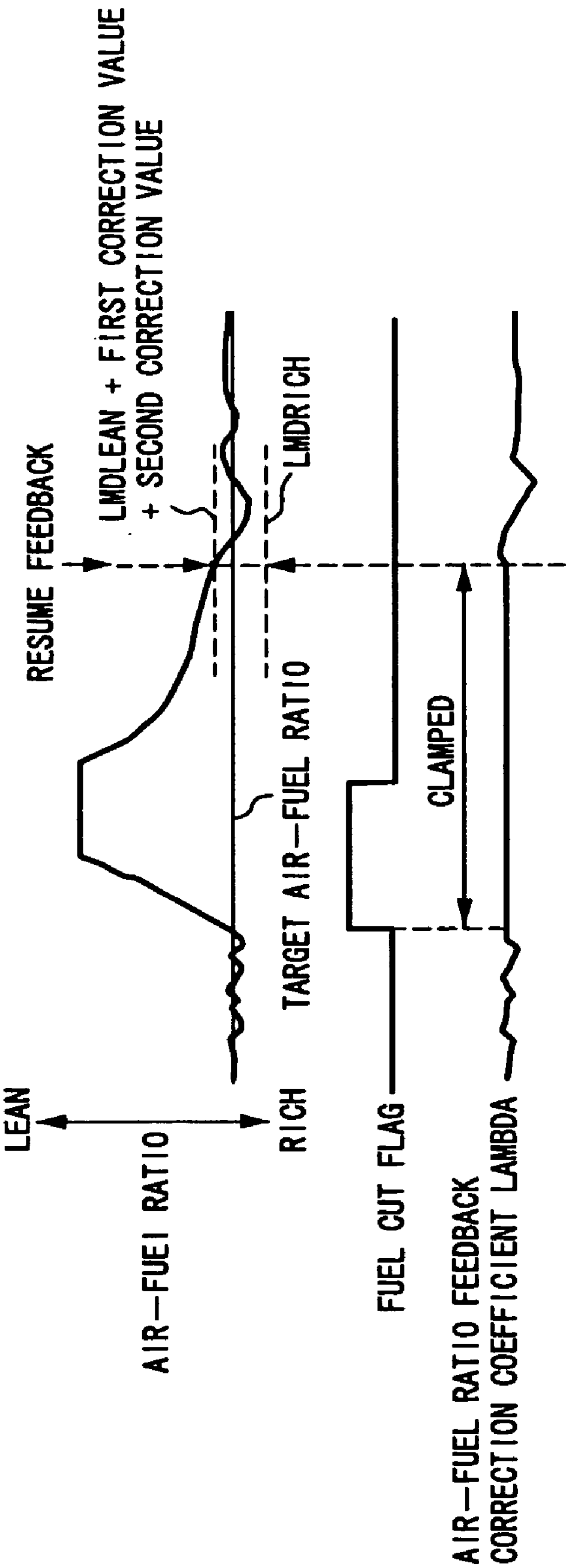
FIG. 10 is a time chart showing resumption timing of air-fuel ratio feedback control according to the embodiment of the invention.

The threshold value SL in FIG. 10 causes the air-fuel feedback control to resume at the point in time when the air-fuel ratio detected by the air-fuel ratio sensor 18 satisfies: "fixed value LMDRICH≦detected air-fuel ratio≦fixed value LMDLEAN+first correction value+second correction value".

Here also, the first correction value is set to a larger value as the transient response of air-fuel ratio sensor 18 improves, thus resuming the air-fuel ratio feedback control from a leaner state.

Furthermore, the second correction value is set to a larger value if the base air-fuel ratio determined from the air-fuel ratio learned correction value is lean, thus resuming the air-fuel ratio feedback control from a leaner state.

The threshold value SL can be set using either one of the first correction value, and the second correction value.

Furthermore, updating of the feedback correction coefficient can begin at the point in time when the difference between the air-fuel ratio detected by air-fuel ratio sensor 18 in an open loop control state, and the air-fuel ratio detected once the conditions for beginning feedback control are met, has reached a predetermined value.

This predetermined value may be a fixed value set in advance, but may also be set in a variable manner based on the difference between the target air-fuel ratio in the open loop control state, and the target air-fuel ratio under feedback control.

Furthermore, determining when to begin feedback control during the transition for example from an open loop control state in which the target air-fuel ratio is a rich air-fuel ratio to a feedback control state in which the target air-fuel ratio is the theoretical air fuel ratio, may be performed based on the air-fuel ratio detected by air-fuel ratio sensor 18.

However, because there is intense fluctuation in the air-fuel ratio immediately after fuel injection is resumed, even when a highly responsive air-fuel ratio sensor 18 is used, it is not preferable for air-fuel ratio feedback control to be resumed immediately.

Figure 11:
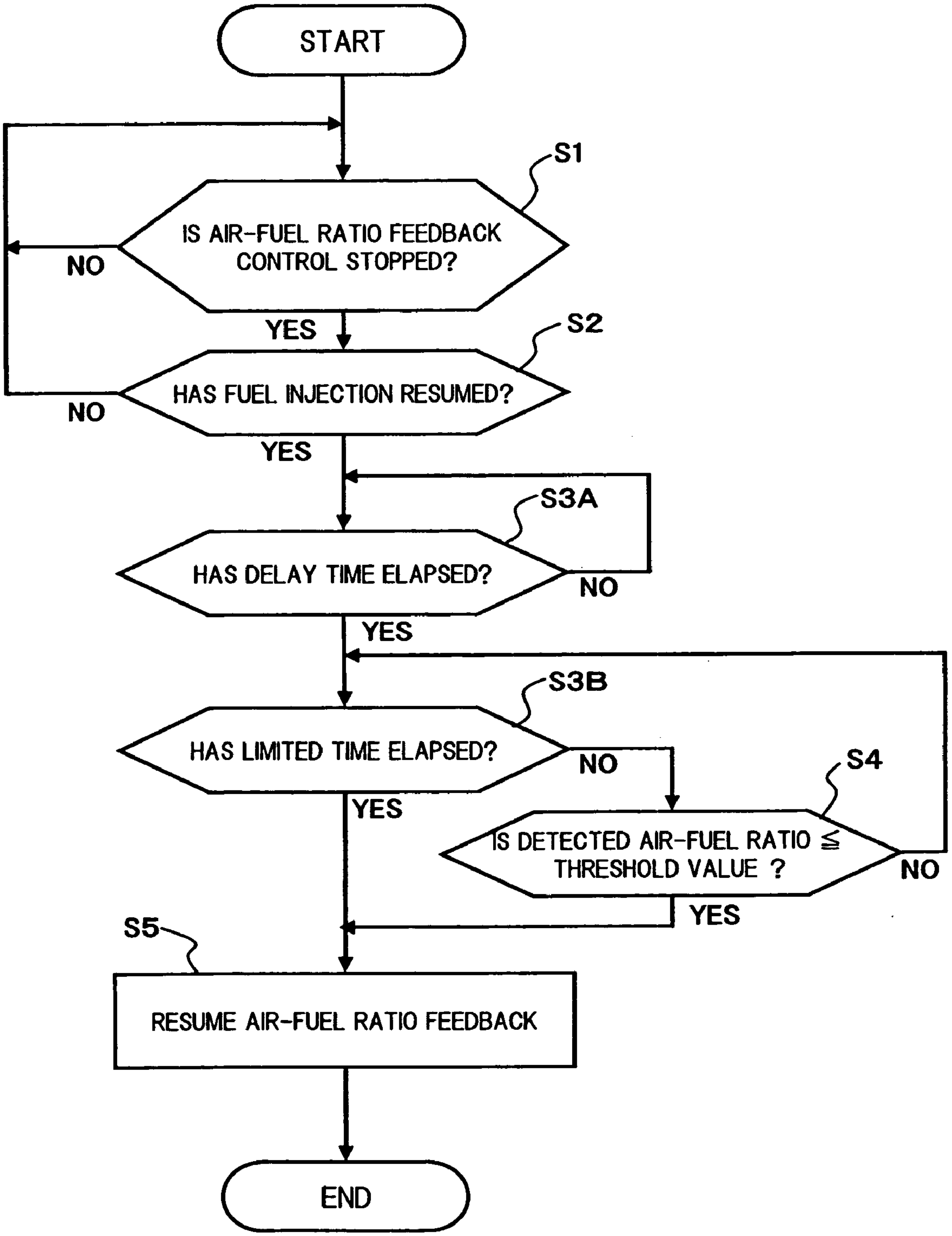
FIG. 11 is a flowchart showing resumption processing for air-fuel ratio feedback control according to the embodiment of the invention.

Accordingly, as shown in the flowchart in FIG. 11, it is possible to determine whether or not the air-fuel ratio detected by air-fuel ratio sensor 18 has reached the threshold value SL, after a time delay has elapsed following resumption of the fuel injection.

In the flowchart in FIG. 11, if it is determined in step S2 that fuel injection has resumed, the flow proceeds to step S3A.

In step S3A, whether or not the delay time has elapsed since fuel injection is resumed, is determined, and once the delay time has elapsed, the flow proceeds to step S3B.

This delay time can be a pre-stored length of time, but may also be set in a variable manner according to such factors as the engine rotating speed and engine load.

In addition, the delay time may be measured as the time until the integrated value of the number of rotations of engine 11 reaches a predetermined number.

In step S3B, a determination is made as to whether or not the limited time (limited time>delay time) has elapsed since fuel injection was resumed, and if the limited time has elapsed, the flow proceeds to step S5 and updating of the feedback correction coefficient is forcibly resumed.

Furthermore, if it is determined in step S3B that the limited time has not elapsed, the flow proceeds to step S4, and whether or not the air-fuel ratio detected by air-fuel ratio sensor 18 has reached the threshold value SL is determined.

The embodiment described by the flowchart in FIG. 11 differs from that in FIG. 4 only in that step S3A has been added, and in the other steps the same processing is performed as in the flowchart in FIG. 4, and therefore the threshold value SL which is compared with the air-fuel ratio detected by air-fuel ratio sensor 18 can use the same threshold value SL as in FIG. 4.

The entire contents of Japanese Patent Application No. 2004-352243, filed Dec. 6, 2004 and Japanese Patent Application No. 2005-150058, filed May 23, 2005 are incorporated herein by reference.

While only selected embodiments have been chosen to illustrate the present invention, it will be apparent to those skilled in the art from this disclosure that various changes and modifications may be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

We claim:

1. An air-fuel ratio feedback control apparatus for an internal combustion engine comprising:

detection means for generating a signal indicating air-fuel ratio of said internal combustion engine; and control means for receiving an input of a signal from said detection means, and calculating and outputting a manipulation signal for matching the air-fuel ratio detected based on said signal with a target value, wherein said control means compares the signal from said detection means with a threshold value, and determines whether or not to begin updating said manipulation signal, based on the results of the comparison.

2. An air-fuel ratio feedback control apparatus for an internal combustion engine comprising:

an air-fuel ratio sensor that is capable of generating a signal indicating air-fuel ratio of said internal combustion engine; and a control section that receives input of a signal from said air-fuel ratio sensor, and calculates and outputs a manipulation signal for matching the air-fuel ratio detected based on said signal with a target value, wherein said control section compares the signal from said air-fuel ratio sensor with a threshold value, and determines whether or not to begin updating said manipulation signal, based on the results of this comparison.

3. An air-fuel ratio feedback control apparatus for an internal combustion engine according to claim 2, wherein said control section sets said threshold value in a variable manner based on an air-fuel ratio in a condition where control by said manipulation signal is stopped.

4. An air-fuel ratio feedback control apparatus for an internal combustion engine according to claim 2, wherein said control section learns said manipulation signal required to match the air-fuel ratio detected based on the signal from said air-fuel ratio sensor with the target value, for each operating condition of said internal combustion engine, and determines the air-fuel ratio in a condition where control by said manipulation signal is stopped, based on the results of said learning.

5. An air-fuel ratio feedback control apparatus for an internal combustion engine according to claim 1, wherein said control section stops updating of said manipulation signal in a condition where fuel supply to said internal combustion engine is temporarily stopped, and after resumption of fuel supply to said internal combustion engine, begins updating of said manipulation signal once a signal from said air-fuel ratio sensor has reached said threshold value.

6. An air-fuel ratio feedback control apparatus for an internal combustion engine according to claim 2, wherein said control section sets said threshold value in a variable manner based on said target value.

7. An air-fuel ratio feedback control apparatus for an internal combustion engine according to claim 6, wherein said control section sets said threshold value in a variable manner based on said target value, so as to determine whether or not an absolute value of a difference between said target value and an actual air-fuel ratio has become a predetermined value.

8. An air-fuel ratio feedback control apparatus for an internal combustion engine according to claim 2, wherein said control section sets said threshold value in a variable manner based on a transient response of said air-fuel ratio sensor.

9. An air-fuel ratio feedback control apparatus for an internal combustion engine according to claim 8, wherein said control section determines the transient response of said air-fuel ratio sensor based on the time it takes for a signal from said air-fuel ratio sensor to reach a predetermined value after switching of said target air-fuel ratio.

10. An air-fuel ratio feedback control apparatus for an internal combustion engine according to claim 2, wherein said control section determines whether or not conditions are for updating said manipulation signal, and after determining that conditions for updating said manipulation signal have been met, begins updating said manipulation signal once the signal from said air-fuel ratio sensor has reached said threshold value.

11. An air-fuel ratio feedback control apparatus for an internal combustion engine according to claim 10, wherein said control section, after determining that conditions for updating said manipulation signal have been met, begins updating of said manipulation signal when a signal from said air-fuel ratio sensor has not reached said threshold value within a limited time.

12. An air-fuel ratio feedback control apparatus for an internal combustion engine according to claim 11, wherein said limited time is a time until an integrated value of the number of revolutions of said internal combustion engine becomes a predetermined number.

13. An air-fuel ratio feedback control apparatus for an internal combustion engine according to claim 10, wherein said control section determines whether or not the signal from said air-fuel ratio sensor has reached said threshold value, once a delay time has elapsed from after determining that conditions for updating said manipulation signal have been met.

14. An air-fuel ratio feedback control apparatus for an internal combustion engine according to claim 13, wherein said delay time is a time until an integrated value of the number of revolutions of said internal combustion engine becomes a predetermined number.

15. An air-fuel ratio feedback control method for an internal combustion engine having an air-fuel ratio sensor capable of generating a signal indicating air-fuel ratio, the internal combustion engine outputting a manipulation signal for matching the air-fuel ratio detected by said air-fuel ratio sensor with a target value, wherein the method comprises the steps of:

determining start conditions for beginning said air-fuel ratio feedback control;

comparing a signal from said air-fuel ratio sensor with a threshold value when said start conditions have been met, and beginning feedback control of said air-fuel ratio after said start conditions have been met and the signal from said air-fuel ratio sensor has reached said threshold value.

16. An air-fuel ratio feedback control method for an internal combustion engine according to claim 15, further comprising the step of:

setting said threshold value in a variable manner based on said target value.

17. An air-fuel ratio feedback control method for an internal combustion engine according to claim 15, further comprising the step of:

setting said threshold value in a variable manner based on an air-fuel ratio in a condition where control by said manipulation signal is stopped.

18. An air-fuel ratio feedback control method for an internal combustion engine according to claim 15, further comprising the step of:

setting said threshold value in a variable manner based on a transient response of said air-fuel ratio sensor.

19. An air-fuel ratio feedback control method for an internal combustion engine according to claim 15, wherein said step of determining the start conditions for said air-fuel ratio feedback control determines conditions for resumption of fuel supply after a state where fuel supply to said internal combustion engine is temporarily stopped.

20. An air-fuel ratio feedback control method for an internal combustion engine according to claim 15, further comprising the steps of:

determining whether or not an elapsed time from when start conditions of said air-fuel ratio feedback control have been met, has reached a limited time, and beginning said air-fuel ratio feedback control when up until said elapsed time becomes said limited time, a signal from said air-fuel ratio sensor has not reached said threshold value.

21. An air-fuel ratio feedback control method for an internal combustion engine according to claim 20, wherein said step of determining whether or not said elapsed time has reached a limited time, determines whether or not an integrated value of the number of revolutions of said internal combustion engine from after said start conditions have been met, has become a predetermined number.

22. An air-fuel ratio feedback control method for an internal combustion engine according to claim 15, wherein said step of comparing the signal from said air-fuel ratio sensor with a threshold value, comprises the steps of:

determining whether or not a delay time has elapsed from after determining that said start conditions have been met; and determining whether or not a signal from said air-fuel ratio sensor has reached said threshold value, once said delay time has elapsed.

23. An air-fuel ratio feedback control method for an internal combustion engine according to claim 22, wherein said step of determining elapse of said delay time, determines whether or not an integrated value of the number of rotations of said internal combustion engine from after said start conditions have been met, has become a predetermined number.

* * * * *

UNITED STATES PATENT AND TRADEMARK OFFICE

CERTIFICATE OF CORRECTION

PATENT NO. : 7,281,533 B2
APPLICATION NO. : 11/293099
DATED : October 16, 2007
INVENTOR(S) : Akira Kiyomura and Hisanori Ozaki It is certified that error appears in the above-identified patent and that said Letters Patent is hereby corrected as shown below:

Column 9, line 51, please delete the following “internal combustion engine according to claim 1” and replace with: -- internal combustion engine according to claim 2 --.

Signed and Sealed this

Tenth Day of February, 2009

JOHN DOLL
*Acting Director of the United States Patent and Trademark Office*